No. 654,467. Patented July 24, 1900.
J. MACTEAR.
FURNACE FOR HEATING AND TREATING GASEOUS MIXTURES.
(Application filed Oct. 4, 1899.)
(No Model.)

Witnesses.
Thos. Kirkpatrick
E. A. van Oldenneel

Inventor
James Mactear,
by Alexander & Co
Attorneys

UNITED STATES PATENT OFFICE.

JAMES MACTEAR, OF LONDON, ENGLAND.

FURNACE FOR HEATING AND TREATING GASEOUS MIXTURES.

SPECIFICATION forming part of Letters Patent No. 654,467, dated July 24, 1900.

Original application filed September 16, 1899, Serial No. 730,701. Divided and this application filed October 4, 1899. Serial No. 732,510. (No model.)

*To all whom it may concern:*

Be it known that I, JAMES MACTEAR, a subject of the Queen of Great Britain and Ireland, and a resident of 28 Victoria street, London, England, have invented a certain new and useful Improved Furnace for Heating and Treating Gaseous Mixtures, (for which I have filed applications for patents in Great Britain on March 7, 1899; in Germany on August 30, 1899; in Spain on August 30, 1899; in Austria on September 1, 1899; in Switzerland on September 1, 1899; in Norway on September 1, 1899; in Belgium on September 2, 1899; in France on September 2, 1899; in Italy on September 2, 1899; in Sweden on September 2, 1899; in Russia on September 2, 1899; in Hungary on September 3, 1899, and in Canada on September 18, 1899,) of which the following is a specification.

This invention relates to an improved furnace adapted for uniformly heating and treating mixtures of gases which for the purpose of causing chemical reaction of the components upon one another require to be exposed to a high temperature, while at the same time exposing the same to any suitable reagent varying according to the gases or gaseous mixture to be treated, the improved furnace being, however, specially applicable for use, as hereinafter described, in the obtainment of alkaline cyanids and cyanogen compounds in the production of ammonium cyanid from a gaseous mixture of carbonic oxid and ammonia alone or with nitrogen or nitrogen and hydrogen for insuring in such mixture that uniform temperature and that intimate contact required for complete conversion and the obtainment of the desired product in the most economical way and without the production of useless by-products. In such process, as more particularly described in a previous application for United States Patent, signed and executed by me on August 10, 1899, and filed September 16, 1899, Serial No. 730,701, of which this is a division, the ammonium cyanid is obtained by submitting a mixture of gaseous ammonia and gaseous carbonic oxid in a decomposing-chamber charged with wood-charcoal or other suitable catalytic substance and heated internally by the employment of an electrical resistance to a temperature sufficient to decompose such gaseous mixture and to cause the formation of the ammonium cyanid, from which the required alkaline cyanid and cyanogen compounds can be prepared by suitable known means.

Figure 1:
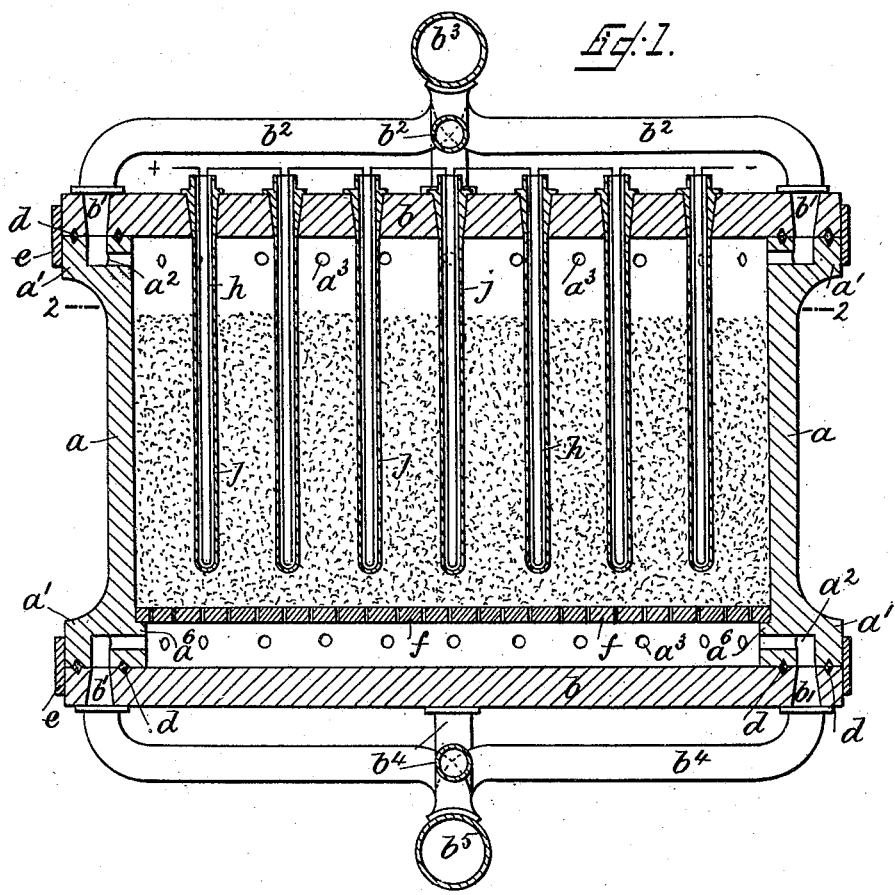
Figure 2:
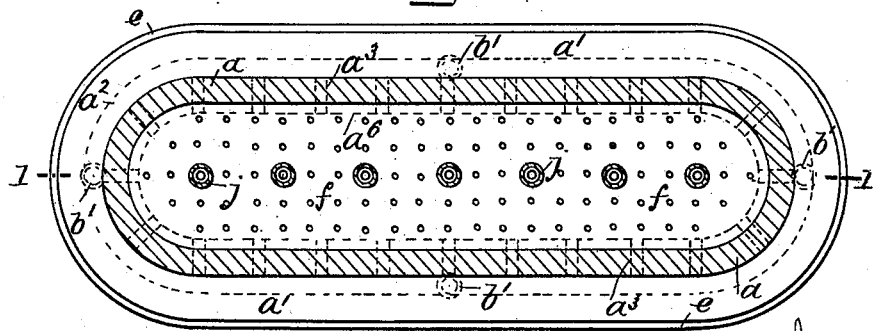

On the accompanying drawings, Figure 1 represents the furnace in sectional elevation on the line 1 1, Fig. 2; and Fig. 2 represents the same in sectional plan on the line 2 2, Fig. 1, but not showing the catalytic substance.

$a$ represents a vertically-arranged chamber, made of porcelain or other suitable refractory material and formed of an oblong shape, Fig. 2, with open ends and flanged extensions $a'$, the end faces of which are each formed with a surrounding annular channel $a^2$, which communicates with the interior of the chamber by lateral perforations $a^3$.

The chamber ends are closed by covers $b$, each of which is formed with through-openings $b'$, adapted to communicate with the adjacent channels $a^2$ of the chamber. The openings $b'$ at the inlet end of the chamber communicate by branched piping $b^2$ with a main $b^3$, leading from the mixing-chamber of the gases to be decomposed, and the openings $b'$ at the outlet end of the chamber communicate by branched piping $b^4$ with a main $b^5$, by which the products of the reaction of the gases in the chamber are led to absorption vessels wherein the ammonium cyanid is or may be converted into any required alkaline cyanid or other cyanogen compound by suitable means.

The chamber ends and its end covers are luted together at $d$ by a suitable cement and are also bound together by metal bands $e$. The bottom end of the chamber is made with an inner ledge $a^6$, serving to support a perforated bottom $f$, by which the catalytic substance $g$ employed is supported.

The chamber is heated internally by a series of electrical resistances $h$, preferably in the form of coils of platinum wire wound upon a support of refractory material mounted in a tube $j$, of refractory material, passing into or through the chamber, the resistances being connected in series or otherwise with a dynamo or other source of electric energy, by means of which their temperature can be raised to such a point as will give the required equal temperature in the spaces between the adjacent tubes $j$, and also in those between each thereof and the adjacent sides of the chamber, whereby the desired equable temperature of the whole interior of the decomposing-chamber is effectually obtained.

The heating of the decomposing-chamber internally by the employment of an electric resistance is of special utility and advantage in enabling a practically-equal temperature throughout the chamber to be obtained, which is so essential a requirement to the economical obtainment of products from gaseous mixtures, and also in enabling the chamber to be made of such a size and of such internal dimensions as will enable the process to be carried out on a commercial scale with considerable economy as compared with existing means of obtaining products from such mixtures.

What I claim as my invention, and desire to secure by Letters Patent, is—

1. An apparatus for decomposing gaseous mixtures, comprising a body having open ends, a flat cover and bottom fitting said ends, tubes of refractory material inserted through and depending from the cover and spaced equidistant from each other and from the sides of the body, said tubes having closed lower ends, electric resistances inside of said tubes, and pipes for supplying the gaseous mixture and drawing off the products of its treatment.

2. An apparatus for decomposing gaseous mixtures, comprising a body having flanged and perforated ends, a flat bottom and cover having corresponding perforations, a perforated diaphragm supported shortly above said bottom, a catalytic substance nearly filling the body above said diaphragm, pipes connecting with the perforations in the cover and bottom, tubes of refractory material depending from the cover into the catalytic substance and spaced equidistant from each other and from the sides of the body, and electric resistances within said tubes.

3. An apparatus for decomposing gaseous mixtures, comprising a body provided with removable cover and bottom, a catalytic substance contained in said body, refractory tubes depending into said substance, and electric resistances within said tubes.

In testimony whereof I have signed my name to this specification in the presence of two subscribing witnesses.

JAMES MACTEAR.

Witnesses:
   CHARLES AUBREY DAY,
   ALFRED CHARLES DAY.